Patented June 2, 1936

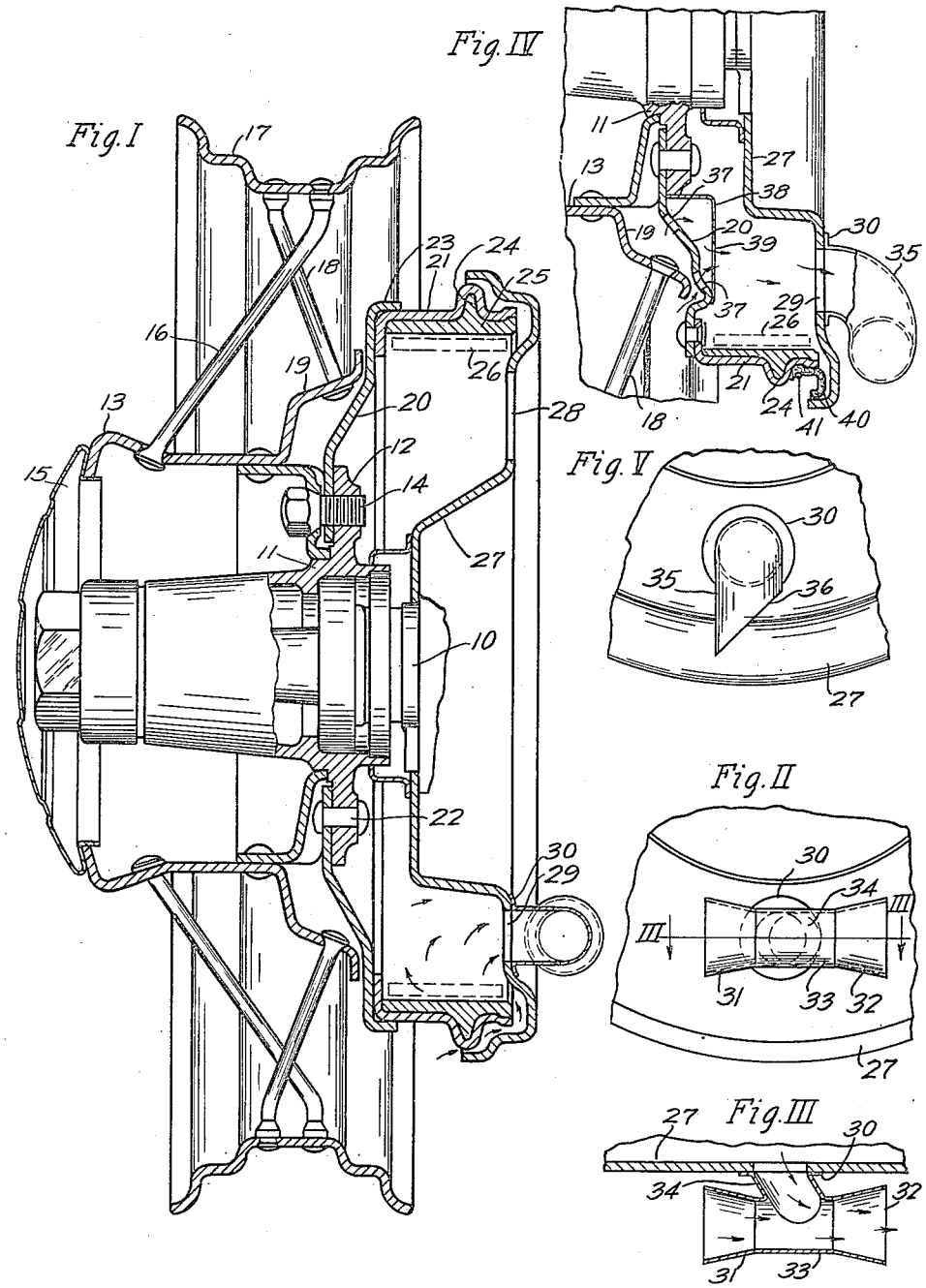

2,042,750

UNITED STATES PATENT OFFICE 2,042,750

BRAKE DRUM CONSTRUCTION

Andrew S. Van Halteren, Akron, Ohio, assignor to Motor Wheel Corporation, Lansing, Mich., a corporation of Michigan Application August 13, 1934, Serial No. 739,626

10 Claims. (Cl. 188—264)

The present invention relates to wheel constructions, and has particular reference to an improved motor wheel structure of the type having a braking mechanism.

Wheel constructions such as are employed on automobiles, trucks and the like customarily are provided with a rotative hub portion to which is secured other wheel structure and a brake drum. This brake drum rotates adjacent suitable braking mechanism, the frictional engagement of which stop the rotation of the wheel. When the braking mechanism is operated the resulting friction creates considerable heat, the temperature of the brake drums in many cases exceeding 600° F. This heat causes excessive distortion and wear of the brake drum and braking mechanism and, in wheels of small diameter, accelerates the deterioration of the rubber tire carried by the wheel.

The principal object of the present invention is to provide a wheel construction having an improved cooling mechanism for dissipating the heat therefrom.

An additional object is the provision of a wheel construction having a particularly desirable structure for internal circulation of air therethrough.

A still further object is to provide an air circulation structure for the braking system of a wheel construction.

These and other objects will be apparent from a consideration of the following descriptions of preferred embodiments of the invention and by reference to the accompanying drawing, in which Figure 1 is a cross-sectional view of a wheel structure disclosing one embodiment of the invention;

Fig. 2 is a fragmentary side view of the suction device shown in Fig. 1.

Fig. 3 is a sectional view taken along line 3—3 of Fig. 2;

Fig. 4 is a fragmentary sectional view of a wheel construction constituting a preferred embodiment of the invention; and Fig. 5 is a fragmentary side view of the suction-creating device shown in Fig. 4.

In the wheel construction shown in Figs. 1, 2 and 3 an axle structure 10 is provided with a rotatable hub portion 11 of conventional construction. To the annular flange 12 of the hub portion 11 is demountably secured an outer hub portion 13 by means of a series of wheel bolts or lugs 14 extending through the outer hub portion and engaging threaded openings in the flange 12. The end of the outer hub portion 13 is closed by a hub cap 15. A series of outer spokes 16 extend between the outer hub portion 13 and a tire rim 17. A series of inner spokes 18 extend between an outstanding hub flange 19 and the rim 17.

The braking system of the wheel construction includes a brake drum consisting of a central outwardly extending drum back 20 and an outer substantially horizontal drum ring 21. The drum back 20 is permanently secured to flange 12 of the hub portion by means of a series of rivets 22, the wheel bolts 14 also assisting in the securement of the brake drum to the hub portion. The outer edge of the drum back 20 is turned over to form a flange 23, beneath which is attached as by welding the drum ring 21. Ring 21 is composed of a pressed steel plate having a bulge 24 adjacent its outer edge. On its inner surface ring 21 is provided a braking surface. In the embodiment shown in Fig. 1 this braking surface is composed of a cast iron liner 25.

When in use on an automobile the wheel construction described rotates about the axle 10. Movement of an automobile to which the wheel is attached is controlled by means of a suitable braking mechanism, the details of which it is unnecessary to disclose specifically herein. The braking mechanism is of the usual internal expansion type and has an expansion shoe 26 indicated in dotted lines which moves into frictional engagement with the liner 25 when the brakes of the automobile are applied.

Considerable difficulty has been encountered heretofore in obtaining a braking surface between brake band 26 and liner 25 which is even under all conditions. The drum back 20 ordinarily may be composed of pressed steel as may be the ring member 21, which is attached thereto. Regardless of the particular metal of which they are composed, changes in the temperature of these members naturally results in an expansion or contraction of the metal thereof. The brake drum is securely attached at its radially inner portion by means of the rivets 22 so that the expansion or contraction is effective upon the outer or unattached portions of the drum. Ring 21 and the liner 25 are of substantially horizontal tubular formation and the axially inner or free edge of the composite ring is free to expand in any direction. The axially outer edge of the ring is attached as by welding to the outer portion of drum back 20, so that this outer edge cannot freely expand or contract upon changes of temperature. More particularly, the drum back acts to retard the expansion of the attached edge of the drum ring upon an increase in the temperature of the latter. If the braking surface of liner 25 and brake band 26 are adjusted in parallel relation while the car is standing at normal temperature the maximum braking surface is afforded. However, when the wheel construction is in use and the brakes are applied the resulting friction causes liner 25 and ring 21 to heat up. Upon this increase in temperature the ring 21 tends to expand to such an extent that the axially inner or free edge of the drum ring is of greater diameter than the axially outer attached edge of the drum ring. Obviously, when this condition is present, the brake drum 26 contacts the braking surface of liner 25 along a portion only of its surface. That is, as the ring pivots about its outer edge, this outer edge is of less diameter than the diameter of the free edge of the ring. Thus, the ring tends to increase in diameter toward its inner or free edge, and when the brake band or shoe 26 is pressed outwardly, it contacts the portion of the liner 25 having a relatively small diameter. As a result of this action, the effectiveness of the braking system is reduced and the brake band 26 wears away adjacent its outer edge.

To a fixed portion of the axle structure is mounted an outwardly extending backing plate 27 which extends adjacent the inner or unattached edge of ring 21. An opening indicated at 28 ordinarily is provided in the upper part of the backing plate 27 and suitable brake-operating structure (not shown) extends through this opening and into operative relation with the brake band 26.
In its lower portion the backing plate is provided with a second opening 29 about which is secured a suitable device indicated generally at 30 for creating an air current within the housing formed by the brake drum and backing plate.
In the embodiment of the invention shown in Figs. 1, 2 and 3 this device consists of a Venturi tube construction having an enlarged inlet 31 facing the direction of travel of the car and a similar outlet 32 separated therefrom by means of a restricted central portion 33. The Venturi device is secured to the opening 29 of the backing plate by means of a tubular connection 34 which is inclined away from the direction of travel of the automobile to which the wheel construction is attached.

As the wheel construction moves in a forwardly direction air rushes through the Venturi device and a space of reduced pressure is created adjacent tube 34, thereby causing a current of air to be withdrawn from the housing, through the tubular connection 34 and out of the outlet 32.

A suitable inlet for the braking housing may be provided by spacing the outer edge of backing plate 27 from the free edge of the ring 21, as shown in Fig. 1. This construction forms an annular air channel about the periphery of the ring 21 and as the air enters the housing it is sufficiently turbulent to contact the heated portions of the braking system before emerging through the Venturi device, thereby acting as a cooling fluid for the heated portions of the wheel construction. This circulation of air through the braking system may be continuous so that the tendency of the structure to over-heat is reduced and when the temperature is temporarily increased by application of the brakes there is a more ready return to normal conditions.

To reduce the hazard of water entering the passage between ring 21 and backing plate 22, the outer edge of the latter is pressed into a tortuous shape to conform to the shape of the free edge of ring 21, as shown in Fig. 1.

In the modification shown in Figs. 4 and 5, the air current-producing device 30 surrounding the opening 29 of backing plate 27 is formed by a single outwardly and downwardly extending tube 35 which is cut away at its free end on the side opposite that toward which the wheel construction travels, as indicated at 36 in Fig. 5, to form a suction-inducing structure. Also, the drum back 20 is provided with a plurality of spaced air inlet openings 37 between ring 21 and the hub portion 11. Within the braking housing and adjacent the openings 37 is provided a thin metal protective member 38. This member surrounds openings 37 and is spaced therefrom to form an air chamber with the drum back 20. In a position out of alignment with openings 37 the member 38 is provided with an opening 39. It is preferred that the ends of the member 38 be secured as by welding to the drum back 20.

In this modification the ring 21 and backing plate 27 may be sealed so as to prevent the entrance of air, water and dust by means of a suitable sealing ring 40 and a retaining wire 41.

Upon forward motion of the automobile to which the wheel construction described is attached air rushes past the cut-away portion 36 and induces a vacuum in its wake, thereby causing air from the brake housing to emerge through the backing plate 27. Additional air is supplied the brake housing by means of the openings 37 and the opening 39. Inlet air passes between drum back 20 and flange 19 and then through the openings 37 into the chamber formed by the member 38. From this chamber the air is admitted to the brake housing and in the housing the air is of sufficient turbulence to contact the metallic structure of the braking system enough to retard the rise in its temperature normally occurring upon application of the braking mechanism. The downward direction of the tube 35 prevents water from running into the braking housing and also retards the settling of dust in the housing. The inlet chamber formed by the member 38 also makes it difficult for dust to enter the brake housing, particularly when the opening 39 in member 38 is out of alignment with openings 37 of the drum back 20.

It will be seen that the action of the structure described herein causes a turbulent stream of air to be circulated through the brake housing and in contact with heated parts. Furthermore, in the modification shown in the drawing, motion of the car is sufficient to create the air current necessary for cooling purposes. In both embodiments of the invention shown in the drawing, the general course of air passing through the structure is indicated by arrows.

It will be understood that various changes in the particular structure described herein are possible without departing from the invention. As an example, a wheel construction may be employed in which the ring 21 does not have a separate liner or the corrugation 24. Also, other air current-inducing instrumentalities such as an exhaust connection may be employed. These and other modifications coming within the scope of the invention are intended to be included in the appended claims.

I claim:

1. In a wheel construction, a rotatable hub portion, a brake drum mounted on said hub portion, said brake drum including a substantially horizontal outer drum ring portion and a substantially vertical drum back portion provided with an inlet opening, a perforated protective plate mounted on said back portion in spaced relation to the inlet opening therein, and a non-rotative backing plate mounted adjacent said drum ring portion, said backing plate being provided with means for drawing air therethrough.

2. In a wheel construction, a rotatable hub portion, a brake drum mounted on said hub portion, said drum including an outer drum ring portion and a central drum back portion having an air inlet opening, a protective plate secured to said drum back portion about the opening therein and in spaced relation to said opening, a non-rotative backing plate provided with an opening therein mounted adjacent said ring portion and forming therewith a brake housing, and a suction device operable upon motion of said wheel construction for exhausting air from said housing.

3. In a wheel construction, a rotatable hub portion, a brake drum mounted on said hub portion, a non-rotative backing plate mounted adjacent said brake drum and being spaced therefrom to form an air inlet, and exhaust means mounted on said backing plate comprising an open ended tube arranged parallel to the direction of translated movement of said wheel and communicating intermediate its extremities with the interior of said brake drum.

4. In a vehicle wheel, a rotatable hub, a brake drum mounted on the hub, a stationary backing plate mounted adjacent the drum and forming therewith a brake housing, and means on said backing plate for withdrawing air from the housing, said means arranged to be actuated by the lateral movement of the housing normally resulting from the rotation of the hub.

5. In a vehicle wheel, a rotatable hub, a brake drum mounted on the hub, a non-rotative backing plate mounted adjacent the drum and forming therewith a brake housing, said housing having an opening for the admission of air, and means on said backing plate for withdrawing air from the housing, said means arranged to be actuated by the lateral movement of the housing normally resulting from the rotation of the hub.

6. In a vehicle wheel, a rotatable hub, a brake drum mounted on the hub, a non-rotative backing plate mounted adjacent said backing plate and forming therewith a brake housing, and Venturi means arranged to be actuated to withdraw air from said housing by the lateral movement thereof.

7. In a vehicle wheel, the combination with a brake housing movable laterally by the rotation of the wheel of an exhaust tube connected thereto and arranged to be actuated by the lateral movement thereof to withdraw air therefrom.

8. In a vehicle wheel, the combination with a brake housing including rotatable and non-rotative portions of means for withdrawing air therefrom comprising a Venturi tube mounted on said non-rotative portion and arranged to be actuated by the lateral movement thereof.

9. In a vehicle wheel, the combination with a brake housing having an air inlet opening and including rotatable and non-rotative portions of means for drawing air into said housing through said opening comprising a Venturi tube mounted on said non-rotative portion and arranged to be actuated by the lateral movement thereof.

10. In a vehicle wheel, the combination with a brake housing movable laterally by the rotation of the wheel of means for withdrawing air therefrom comprising a suction device associated with a wall of said housing and having a rearwardly facing opening with respect to the normal direction of travel of the housing in response to rotation of the wheel.

ANDREW S. VAN HALTEREN.